United States Patent [19]

Gorman

[11] Patent Number: 5,440,866
[45] Date of Patent: Aug. 15, 1995

[54] TOOL FOR AMBIDEXTROUS FRUIT PICKING

[75] Inventor: Timothy P. Gorman, Afton, Va.

[73] Assignee: Cardinal Point, Inc., Afton, Va.

[21] Appl. No.: 305,275

[22] Filed: Sep. 13, 1994

[51] Int. Cl.⁶ .................. A01D 1/00; A01D 46/00
[52] U.S. Cl. ........................... 56/239; 56/331
[58] Field of Search .................... 36/239–243, 36/328.1, 331; 30/232

[56] References Cited

U.S. PATENT DOCUMENTS

| | | | |
|---|---|---|---|
| 964,788 | 7/1910 | Keating | 56/331 X |
| 1,042,240 | 10/1912 | Lillick | 56/331 |
| 1,101,331 | 6/1914 | Reinoehl | 56/331 |

*Primary Examiner*—Michael Powell Buiz
*Attorney, Agent, or Firm*—Basile and Hanlon

[57] ABSTRACT

A device for picking fruit mounted on either the right hand or left hand of the user which includes an elongate central strip having a first end and an opposed second end with a longitudinal axis extending from the first to the second end and a latitudinal axis perpendicular to this longitudinal axis defining a first normal plane together with an end member attached to the first end of the elongate central strip and extending contiguously outward from the first normal plane of the central strip. The device also includes a cutting blade attached to the second end of the central strip extending angularly outward from the normal plane. The device is adapted to be inserted onto the finger or fingers of the user such that the cutting blade can be brought into contact with the stem of a fruit to be harvested by the grasping motion of the picker's hand.

18 Claims, 2 Drawing Sheets

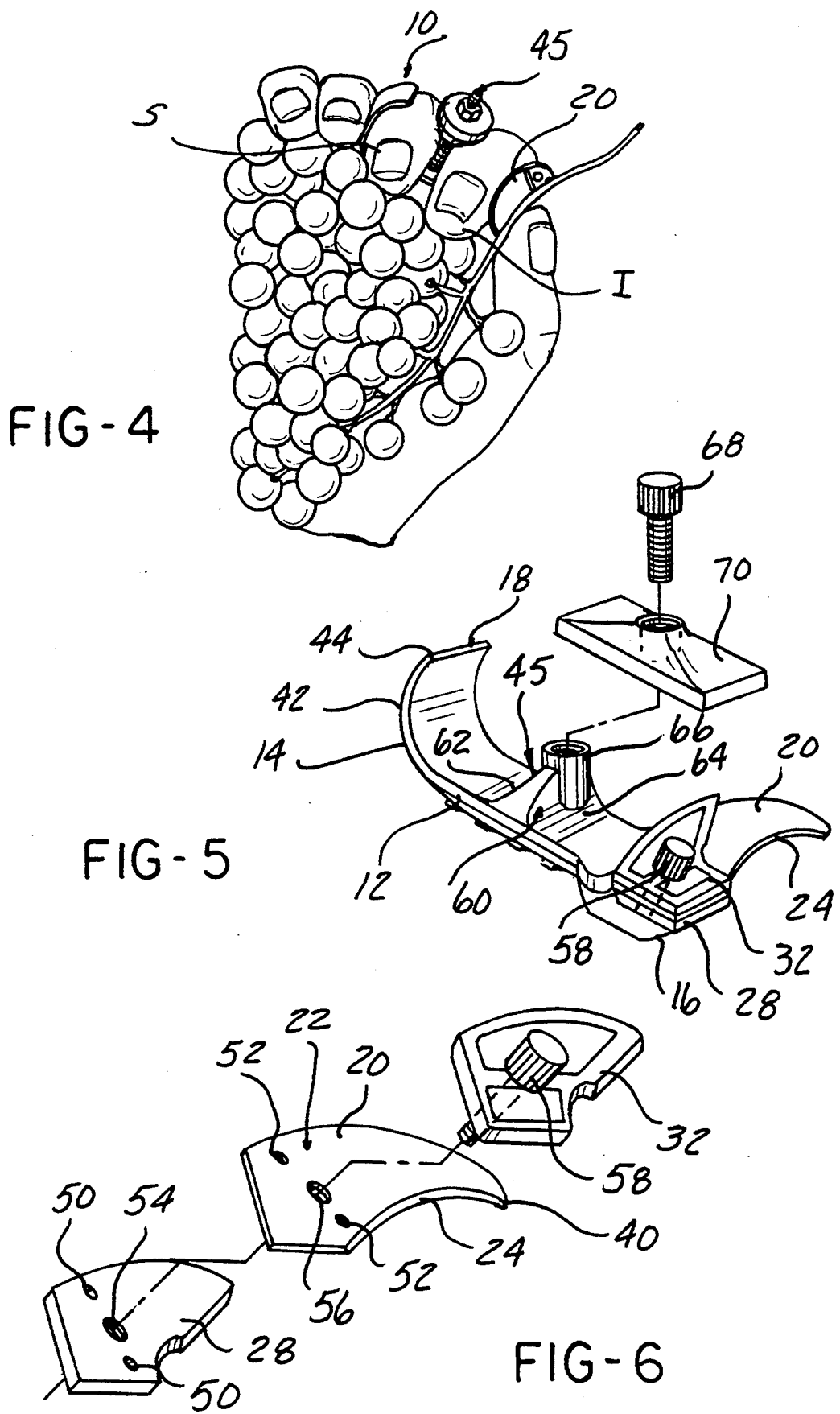

TOOL FOR AMBIDEXTROUS FRUIT PICKING

FIELD OF THE INVENTION

This invention pertains to hand-held devices for harvesting small fruit particularly fruit with vitrified stems.

BACKGROUND OF THE INVENTION

The need for speedy, efficient and economical fruit harvesting operations is virtually undisputable. Most small fruits, such as grapes, peaches, tomatoes, berries, etc., require speedy and careful handling and processing in order to maintain maximum flavor, freshness and taste. On large tracts, extensive plantings of small fruits such as wine grapes permit the use of large, expensive machines to accomplish harvest. For instance, in areas of California, these expensive machines have largely supplanted manual harvesting. However, even where manual harvesting has proven cost effective, wine makers remain interested in hand picked produce because it gentles the process; yielding higher quality produce for wine making. In the eastern United States, small orchards and vineyards predominate. In such areas, machine harvesting is inappropriate and is comparatively rare. In some states, such as Virginia, the average vineyard is approximately five acres. At such establishments, self-propelled or tractor-drawn mechanical grape harvesters are cost-prohibitive and rare. Thus, most grapes, peaches, tomatoes, berries and other small fruits are picked by hand.

The hand-picking process is extremely labor intensive and, in the case of wine grapes, exposes the vineyard owner to the risk of many unanticipated expenses over and above the basic cost for harvesting. These costs are both monetary, i.e. incurred in the form of bonuses paid for ensuring that each picking basket or lug is completely full of fruit; or indirectly monetary, i.e. in the difficulty for arranging sufficient pickers to gather the vineyard fruit when it reaches optimum ripeness. In such enterprises, the vineyard owner cannot anticipate the vagaries of ripening or weather. This is further compounded because grapes can proceed from ripe to rot with alarming speed.

As can be appreciated, grape varieties tend to mature at the same time in any given region, thus, the competition for labor can be extremely intense at harvest time. All too often, a small grower finds that he must enlist the assistance of himself, his family and friends to ensure that the grape crop is gathered and delivered to the winery expeditiously without costly and deleterious delays. As can be appreciated, cut grapes aspirate rapidly losing weight. Additionally, enzymes start converting grape juices to vinegar as soon as the stem is cut. Thus, small producers which represent the numerical majority in the business have a strong interest in providing means whereby pickers are capable of filling the picking baskets or lugs to their capacity in a rapid, safe and efficient manner.

The present method for manual harvesting of small fruit such as grapes generally employs a hand-held picking tool such as a sharp pair of pointed scissors or shears. These shears have a double blade and a biasing means holding the blades in the open position. Compressive force exerted on the blade handles causes the blades to contact one another, severing anything interposed between the two blade surfaces.

The picker holds these shears in his dominant, usually right, hand. The fruit to be harvested is grasped in the picker's left hand and the stem snipped by the shears held in the right. Grape bunches are picked one by one and deposited in a lug lying at the picker's feet. The picking action requires significant eye-to-hand coordination. This is particularly true when the fruit is obscured behind plant foliage such as grape leaves. Such obstruction often results in self-inflicted wounds for frequently, the picker's eye mispercieves where his left hand is actually located. This type of injury is so common that some growers require their pickers to dawn protective tape on their left forefingers before beginning harvesting.

Thus, it can be appreciated that an improved hand-held picking device would be highly desirable. It is desirable that such a device be capable of enabling the picker to grasp at fruit alternately or simultaneously with either hand. It is also desirable that the device enable a picker to sever the stem of the fruit without crushing or damaging the fruit and retain it in the palm of his hand for subsequent deposit into an appropriate gathering container. It is further desirable that the device be easily positionable on the appropriate region of the hand and capable of being maintained in position without excessive manipulation by the picker. It is further desirable that the device contribute to the ergonomic efficiency of the harvesting operation.

SUMMARY OF THE INVENTION

The present invention is a hand-held device for picking fruit; particularly fruits having a vitrified stem. The device includes an elongated central strip having a first end and opposed second end. The elongated strip has a longitudinal axis which extends from the first to the second end and a latitudinal axis perpendicular thereto, the longitudinal and latitudinal axes intersecting and extending in a first normal plane. The device also has an end member attached to the first end of the elongate central strip which extends outward from the first normal plane of the elongate central strip to a position which can be considered above the relative normal plane. This end member serves to secure the hand-held device in position on the picker's hand.

Finally, the device also includes a cutting blade attached to the opposed second end of the elongate central strip. The cutting blade is positioned angularly to the normal plane and, preferably, extends outward from the normal plane at an orientation which permits the cutting surface to be oriented between 45° and 120° relative to the orientation of the end member.

The device is adapted to be mounted on one or more fingers of the picker, preferably at or adjacent to the second joint of the picker's hand with the elongate central strip contacting the finger surface on the palm side of the picker's hand. In the preferred embodiment, the elongate central strip has a length sufficient to accommodate the positioning of at least two fingers within the device.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings in which like reference numerals refer to like parts throughout the several views, and wherein:

FIG. 4 is a perspective view of the device of FIG. 1 being employed to pick a bunch of grapes;

FIG. 5 is an exploded view of a second embodiment of the ambidextrous picking device of the present invention; and FIG. 6 is an exploded detail view of the cutting blade and blade mounting region of the device of FIG. 5.

DESCRIPTION OF THE PREFERRED EMBODIMENT

Figure 1:
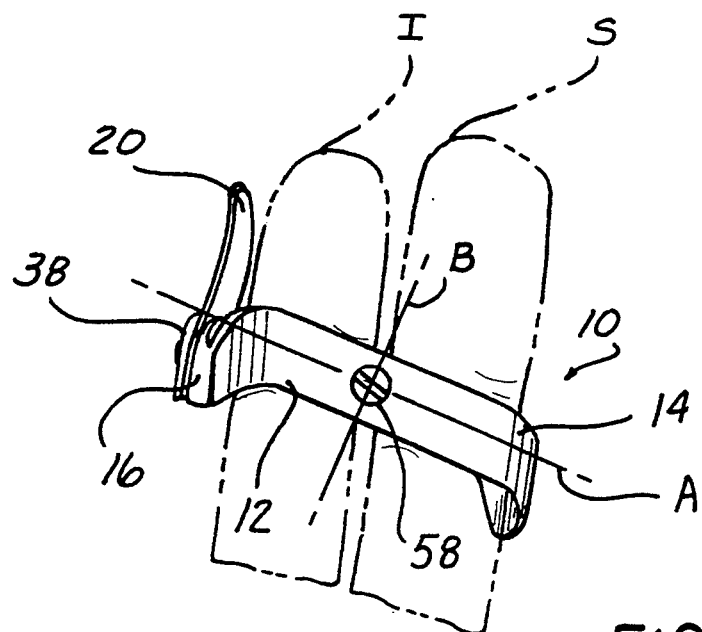
FIG. 1 is a side elevational view of a first embodiment of the ambidextrous picking device of the invention showing placement in the index and second fingers.

The device 10 of the present invention includes an elongate central strip 12 which has a first end 14 and an opposed second end 16. As shown in FIG. 1, the elongate central strip has a longitudinal axis A extending from the first end to the second end and a latitudinal axis B perpendicular thereto. The longitudinal and latitudinal axes A and B extend along and intersect in a first normal plane in which the elongate central strip is positioned.

The ambidextrous picking device 10 includes an end member 18 attached to the first end 14 of the elongate central strip 12. The end member 18 is preferably attached to the central elongate strip in a contiguous manner. The end member 18 extends outward from the first normal plane in a preferably curve linear manner which will be discussed in greater detail subsequently. The device 10 of the present invention also includes a cutting blade 20 attached to the second end 16 of the elongate central strip 12 by any suitable means for attachment. The cutting blade 20 has a broad face 22 with a cutting edge 24 defined thereon. The cutting blade 20 is positioned relative to the first normal plane such that the broad face 22 projects angularly outward therefrom. In the preferred embodiment, deviation from the perpendicular can be as much as 40° from perpendicular.

Attachment of the cutting blade 20 to the elongate central strip 12 can be accomplished by any suitable means. In the first embodiment as particularly shown in the drawing FIGS. 1–3, a curvelinear detent 26 is contiguously formed at the second end 16 of the elongate central strip 12. The detent 26 terminates in a flat outer portion defining flange 28. The cutting blade 20 has a mounting region defined at an inner end. Suitable aperture or apertures can be formed in the flange 28 and the inner end of the broad face 22 of cutting blade 20. Suitable fastening members can be positioned therethrough attaching blade 20 to flange 28. These fastening members can be either permanently fastened in place or fastened by suitable removable members such as bolts to permit replacement of cutting blade 20 with a fresh blade as necessary. The device of the present invention can also include an optional outer cover 32 integrally fastened to the flange 28 with cutting blade 20 interposed there between to provide greater blade stability.

Figure 2:
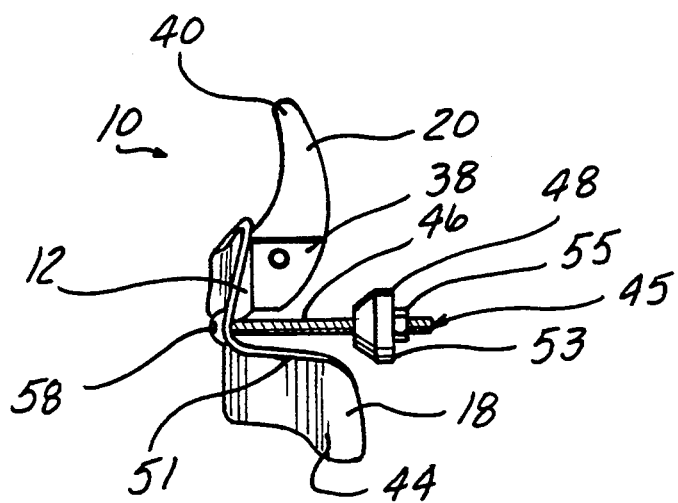
FIG. 2 is an end view of the device shown in FIG. 1.
Figure 3:
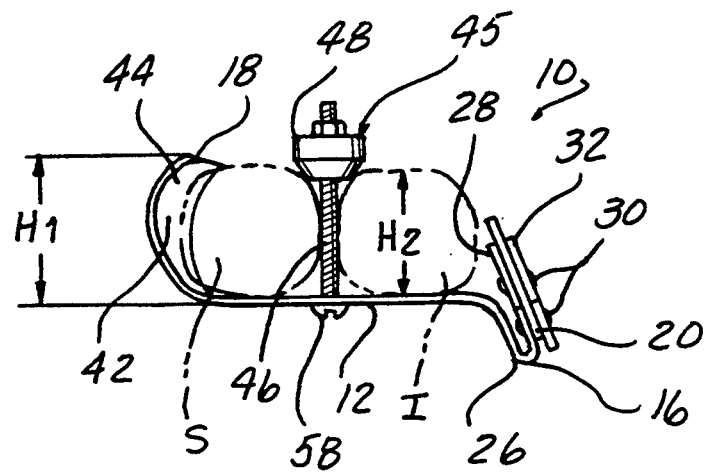
FIG. 3 is a side view of the device shown in FIG. 2 with fingers shown in phantom.

In the first embodiment as shown in FIGS. 1–3, suitable mating aperture or apertures (not shown) are formed in flange 28, cover 32 and mounting region of the cutting blade 20. Bolt fastening members 30 project through the apertures and are permanently welded in place. In the second embodiment, as shown in FIGS. 5 and 6, the flange 28 has at least one outwardly projecting plane guide 50 adapted to be received in a suitable mating aperture 52 located on the mounting region of the cutting blade 20. The flange base 28 also has an internally threaded central aperture 54 which coaxially corresponds with an aperture 56 extending through the mounting region of the cutting blade 20 when the blade 20 is positioned on the blade guide 50. The cover 32 also includes a suitable central aperture (not shown) adapted to receive a suitable lock screw 58 therethrough. When in position, the cover 32 overlies the outer surface of the mounting region of the cutting blade 20 with the lock screw 58 threadingly extending through apertures 54 and 56 in the flange 28 and cutting blade 20 to lockingly position to cutting blade 20 on the central elongate central member 12. In the second embodiment, the lock screw 58 can have a suitable captive screw arrangement in which the outer surface of the screw is threaded to correspond to mating threads in the inner surface of one or more of the apertures. The threaded surface of the screw 58 terminates at a location which corresponds to the location of the aperture in the cover 32. The remainder of the surface of the screw 58 is unthreaded to permit free movement and adjustment.

The cutting blade 20 may have any configuration suitable for severing the stem of the fruit to be harvested. In the preferred embodiment, the cutting blade 20 has an essentially arcuate body having an interior arcuate edge 24 which extends from the mounting region at the inner end where the cutting blade 20 is attached to flange 38 to an outer tip 40. The outer tip 40 may terminate at any suitable point. However, in the preferred embodiment, the outer tip 40 terminates at a point essentially equal to the first normal plane defined by the intersection of the longitudinal and latitudinal axes A and B.

The end member 18 of the present invention is, preferably, contiguously formed with the elongate central strip 12. The end member 18 is characterized by a curved, arcuate central region or intermediate portion 42 which terminates in an upper portion 44 which may be flared as shown in FIGS. 1–3 or simply curvilinear as shown in FIG. 5. The intermediate portion 42 defines one end of the maximum extension or length of the device 10. The upper flared portion 44 is contiguously joined to the intermediate portion and extends back inwardly to define a maximum height $H_1$ between the flared portion 44 and the elongate central strip 12.

In the first embodiment, the terminal end 44 has an outwardly oriented curvilinear shape. The terminal end 44 projects the central elongate strip in a direction essentially opposed to the cutting blade mounted on the second end. The terminal end 44 and intermediate portion 42 are oriented such that the first end of the elongate central strip presents an angular face when viewed from the bottom as shown in FIG. 1. This angular face is, preferably, an acute angle relative to the angle defined by the intersection of the longitudinal axis A and the latitudinal axis B with an angle between about 3° and about 15° being preferred.

The elongate central strip 12 of the device 10 of the present invention preferably has a total length in the normal plane P equal to or greater than the height $H_1$ defined by the end member 18. The length of the elongate central strip 12 is sufficient to accommodate the insertion of at least one finger between the end member 18 located at the first end of the elongated strip and the flange 28 located at the second end 16 of the central elongate strip 12. In the preferred embodiment, the length of the elongate central strip 12 is sufficient to accommodate the insertion of at least two fingers therein in the manner illustrated in FIGS. 1 and 3. It is to be understood that the length of the central strip 12 can accommodate up to and including all four fingers of the picker's hand. However, for picking efficiency and freedom of movement, a device configured to permit the insertion of the second and third metacarpal digits. The index and second finger are preferred.

The device 10 of the present invention also includes a spacer member 45 mounted on and extending perpendicularly outward from the elongate central strip 12. Preferably, the spacer member 45 is positioned at a location essentially medial between the first and second ends 14 and 16 respectively. In use, the spacer member 45 is adapted to extend between the index finger I and second finger S to provide support and orientation for the device 10.

The spacer member 45 can have any suitable configuration to permit the extension and positioning of the two adjacent fingers. In the first embodiment, as shown in FIGS. 1-3, the spacer member 45 includes a pedestal member 46 having a first end and an opposed second end. The first end of the pedestal member 46 is attached to the elongate central strip and extends perpendicularly outward therefrom. The pedestal member 46 extends in the direction essentially defined by both the cutting blade 20 and the end member 18. A suitable mounting knob 48 is positioned proximate to the second end of the pedestal member 46. The mounting knob 48 can have any suitable configuration capable of assisting in the positioning of the device 10 of the present invention. As depicted in the FIGS. 1-3, the mounting knob 48 has a cylindrical body with one frustoconical face 51. The frustoconical face 51 is oriented toward the elongate central strip 12. The opposed face of the mounting knob is essentially flat. A suitable aperture (not shown) extends from the frustoconical face 51 to the opposed flat face 53. The mounting knob 48 can include any suitable means for positioning and maintaining the knob 48 relative to the second end of the pedestal member 46. As depicted in the FIGS. 1-3, the positioning means is a suitable nut 55 which can be threadingly attached to a mating surface defined on the second end of the pedestal member. The pedestal member may have a continuously threaded outer surface or may have an outer surface which is partially threaded in the region of the second end sufficient to accommodate the matingly threaded nut.

The means for mounting the pedestal member 46 to the elongate central strip can be any suitable mechanism. In the first embodiment as depicted in drawing FIGS. 1-3, the pedestal member 46 is inserted through a suitable aperture (not shown) located in the elongate central strip 12. The first end of the pedestal member 46 extends through the aperture and contains a suitable head contacting the opposed face of the elongate central strip. In the first embodiment, the central aperture located in the elongate central strip 12 is internally threaded to accommodate the external threads which extend continuously along the outer surface of the pedestal member.

In the second embodiment as shown in FIG. 5, the spacer member 45 can have a broad lower body 60 integrally formed with the inner surface of the elongate central strip 12 at a position essentially midway between the first and second ends 14 and 16. The lower body 60, preferably has opposed outwardly flaring side regions 62 and 64 which face the end member 18 and the cutting blade 20 respectively. The spacer member 45 also has a cylindrical shaft 66 positioned centrally in the spacer member 45 and extending upward from the spacer member at an orientation essentially perpendicular to the elongate central strip 12. The cylindrical shaft is internally threaded to releasably receive a suitable adjustment screw 68 therein. Adjustment screw 68 permits the releasable and adjustable positioning of finger clamp 70 on the spacer member 45. The rubber finger clamp 70 can have any suitable configuration. As shown in FIG. 5, finger clamp 70 is essentially rectangular with an aperture extending therethrough. Adjustment screw 68 is adapted to extend through this aperture into the threaded surface in cylindrical shaft 66.

Preferably, the height $H_2$ of the spacer member 45 as defined from the innermost surface of the frustoconical face 51 of the mounting knob 48 or the inner surface of the finger clamp 70 to the surface of the elongate central strip 12 is between 50% and 100% of the maximum height of the end member 18 with a height $H_2$ between 80% and 100% being preferred and the height ($H_2$ and $H_1$) of the pedestal member and the end member, respectively, being essentially equal as most preferred.

In employing the device of the present invention, the apparatus 10 is inserted on the hand such that the elongate central strip 12 is contacting the interior surface of at least the index finger I and second finger S of the picker's hand at a position proximate to the central or center phalanges in the respective fingers. When in position, the cutting blade 20 may be essentially parallel and proximate to the outer surface of the center phalanges on the second metacarpal or index finger proximate to the thumb of the respective index finger. The flange 28 contacts the index finger at a position between the outer and intermediate knuckle on the index finger. The end member 18 is adapted to contact the intermediate knuckle of the second finger and place the upper or terminal portion 42 in an overlying relationship with the side surface of the knuckle on the second finger. The spacer member 45 is adapted to extend between the index and second fingers at a position defined by the second bone of the index finger and the region proximate to the distal surface of the central joint or knuckle of the second finger. In this manner, the grasping movement of the hand is not impeded. Thus, the fingers can be flexed or grasped as necessary in the picking motion.

In order to accomplish picking of a bunch of fruit, such as grapes, the hand with the device 10 of the present invention mounted thereon is extended in an essentially open position toward the fruit to be picked. The fruit to be picked is then gathered in the palm of the hand. The fingers of the hand are then brought toward the palm in a corresponding circular motion triggering a corresponding circular motion of the blade 20 with the associated thumb at a position below the path of travel of the blade. The circular motion of grasping the fruit brings the cutting surface 24 of the blade 20 into contact with the stem of the fruit. Continued circular motion severs the stem leaving the fruit in the picker's hand. If necessary, the severing motion can be accompanied by a moderate downward pulling or bending motion to snap the stem as it is being severed. However, it is anticipated that, in most instances, the circular severing motion will be sufficient to cut the fruit stem. It can be appreciated from the drawing figures that the configuration of this device prevent contact of the blade with the hand of the picker during the picking motion; particularly when the thumb is oriented in a suitable grasping position proximate to the third metacarpal. Thus, the device 10 of the present invention permits one-handed picking of grapes or other suitable fruit in a safe and efficient manner.

It is to be understood that the device of the present invention can be manufactured for either right-handed or left-handed use. It is anticipated that a picker would employ a suitable device on both the right and left hands to facilitate two-handed picking of the fruit.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A hand-held device for picking fruit comprising:
   an elongate central strip having a first end and an opposed second end, the elongate central strip having a longitudinal axis extending from the first to the second end and a latitudinal axis perpendicular thereto, the longitudinal and latitudinal axis defining a first normal plane;
   an end member attached to the first end of the elongate central strip, the end member extending contiguously outward from the normal plane of the elongate central strip; and
   a cutting blade attached to the second end of the central strip, the cutting blade extending angularly outward from the first normal plane.

2. The device of claim 1 further comprising:
   a spacer member mounted on and extending essentially perpendicularly outward from the elongate central strip, the spacer member positioned between the end member and the cutting blade.

3. The device of claim 2 wherein the spacer member comprises:
   a pedestal member having a first end and an opposed second end, the first end attached to the elongate central strip, the pedestal member extending outward from the elongate central strip, the pedestal member and the end member defining a second plane extending outward from the first normal plane; and
   a mounting knob movably positioned relative to the pedestal member at a position proximate the opposed second end of the pedestal member.

4. The device of claim 3 wherein the end member contiguously attached to the elongate central strip has a terminal end and a first maximum height defined from the elongate central strip to the terminal end, and the pedestal member has a maximum height defined from the mounting knob to the point of attachment to the elongate central strip, wherein the maximum pedestal height is between about 50% and 100% of the maximum height of the end member.

5. The device of claim 4 wherein the height of the pedestal member and the height of the end member are essentially equal.

6. The device of claim 3 further comprising means for movably positioning the mounting knob relative to the pedestal member.

7. The device of claim 3 wherein the mounting knob comprises:
   a cylindrical body having a first region oriented toward the elongate central strip, a second region contiguous thereto and a shaft extending axially therethrough, the first region having an essentially frustoconical profile wherein the region closest to the elongate central strip has a diameter less than a diameter of the second region.

8. The device of claim 1 wherein the cutting blade comprises a broad face, a cutting edge defined in the broad face, an attachment region at a first end of the cutting edge and an outer tip located at a second end of the cutting edge, the cutting blade mounted on the elongate central strip such that the broad face is essentially perpendicular to the first normal plane.

9. The device of claim 8 wherein the cutting edge of the cutting blade has an arcuate surface extending from the attachment region to the outer tip, wherein the outer tip terminates at a point essentially proximate to the first normal plane.

10. The device of claim 1 wherein the cutting blade comprises a broad face, an arcuate cutting edge defined in the broad face, an attachment region at a first end of the cutting edge and an outer tip located at a second end of the cutting edge, wherein the cutting blade is mounted to the elongate strip at an angle between about 5° and about 20° deviation from an angle perpendicular to the first normal plane.

11. The device of claim 1 wherein the end member comprises:
   an intermediate region contiguously joined to the first end of the elongate central strip and extending arcuately upward therefrom; and
   a terminal region contiguously joined to the intermediate region contiguously joined to the intermediate region having a flared outer section extending opposite to the cutting blade.

12. The device of claim 11 wherein the point of attachment between the first end of the elongate central strip and the intermediate region defines an angular junction at the first normal plane between the first end and the elongate central strip having a value relative to the junction between the longitudinal and latitudinal axes between about 3° and about 25°.

13. A device for picking fruit mounted on at least two fingers of the hand proximate to the thumb, the device comprising:
   an elongate central strip having a first end and an opposed second end, the elongate central strip having a longitudinal axis extending from the first to the second end and a latitudinal axis perpendicular thereto, the longitudinal and latitudinal axis defining a first normal plane, the elongate central strip overlying and in contact with an interior surface of at least two fingers such that the first normal place is parallel to the interior surface and the longitudinal axis is perpendicular to the fingers;
   an end member attached to the first end of the elongate central strip, the end member extending contiguously outward from the first normal plane of the elongate central strip in a manner which releasably contacts the outer surface of the finger contacted by the elongate strip most distant to the thumb; and a cutting blade attached to the second end of the central strip, the cutting blade extending angularly outward from the first normal plane at an orientation adjacent to and essentially parallel to the side surface of the finger proximate to the thumb.

14. The device of claim 13 wherein the cutting blade comprises a broad face, a cutting edge defined in the broad face, an attachment region located proximate to a first end of the cutting edge and an outer tip located at a second end of the cutting edge, the cutting blade mounted in the elongate central strip such that the broad face is essentially perpendicular to the first normal plane and parallel to the first finger.

15. The device of claim 14 wherein the cutting edge of the cutting blade has an arcuate surface extending from the attachment region to the outer tip, wherein the outer tip terminates at a point essentially proximate to the first normal plane, the arcuate surface oriented toward the inner surface of the hand.

16. The device of claim 15 wherein the cutting blade is mounted to the elongate strip at an angle between about 5° and about 20° deviation from an angle perpendicular to the first normal plane.

17. The device claim 14 further comprising:
a spacer member mounted on and extending essentially perpendicularly outward from the elongate central strip, the spacer member positioned between the end member and the cutting blade so as to extend between two of the fingers contacting the elongate central strip.

18. A method for harvesting produce having a stem which is at least partially vitrified comprising the steps of:
grasping the produce to be harvested in a hand of a picker, the hand having a device mounted on at least two fingers, the device comprising:
(a) an elongate central strip having a first end and an opposed second end, the elongate central strip having a longitudinal axis perpendicular thereto, the longitudinal and latitudinal axes defining a first normal plane the elongate central strip overlying and in contact with an interior surfaced of the fingers such that the first normal plane is parallel to the interior surface of the fingers;
(b) an end member attached to the first end of the elongate central strip. The end member extending contiguously outward from the first normal plane of the elongate central strip in a manner which contacts and overlies the outer surface of the overlain finger distal to the thumb; and
(c) a cutting blade attached to the second end of the central strip, the cutting blade extending angularly outward from the first normal plane at an orientation adjacent to and essentially parallel to the side surface of the side surface of the finger proximate to the thumb;
drawing the fingers on which the device is mounted into toward the hand of the picker thereby bringing the cutting blade into engagement with and through the stem of the product to be picked; and
transferring the product from the hand of the picker into a suitable storage container after the stem has been severed.

* * * * *